United States Patent [19]

Zunker

[11] 3,764,587

[45] Oct. 9, 1973

[54] ACRYLIC INTERPOLYMERS FOR FLEXOGRAPHIC INKS

[75] Inventor: David William Zunker, Wilmington, Del.

[73] Assignee: E. I. du Pont de Nemours and Company, Wilmington, Del.

[22] Filed: Apr. 2, 1971

[21] Appl. No.: 130,536

[52] U.S. Cl. ............ 260/80.8, 260/17 R, 260/27 R, 260/78.5 R, 260/33.4 R, 260/38.8 UA, 260/86.1 R, 260/851, 260/873, 117/132 B, 117/138.8 E, 117/138.8 UA, 117/143 A
[51] Int. Cl. ............................................ C08f 15/40
[58] Field of Search ...................... 260/80.8, 78.5 R

[56] References Cited
UNITED STATES PATENTS 3,248,356  4/1968  Snyder .............................. 260/29.6
3,320,196  5/1967  Rogers ................................. 260/27
3,590,118  6/1971  Conrady et al. ....................... 424/19

Primary Examiner—Joseph L. Schofer
Assistant Examiner—Stanford M. Levin
Attorney—Robert E. Patridge

[57] ABSTRACT

Acrylic interpolymers consisting essentially of, by weight, about 25 to 95 percent ethyl methacrylate, about 5 to 75 percent acrylic monomer selected from the group consisting of n-butyl methacrylate, n-butyl acrylate, 2-ethylhexyl methacrylate and 2-ethylhexyl acrylate, and about 0.5 to 10 percent ethylenically unsaturated acid selected from the group consisting of acrylic acid, methacrylic acid and itaconic acid, and having an inherent viscosity of about 0.2 to 0.35 are useful as improved binders for flexographic inks.

8 Claims, No Drawings

ACRYLIC INTERPOLYMERS FOR FLEXOGRAPHIC INKS

BACKGROUND OF THE INVENTION

1. Field of the Invention

This invention relates to acrylic interpolymers which are useful as binders for flexographic inks.

2. Description of the Prior Art

Flexographic printing is widely used for printing nonporous substrates such as films, foils and some heavier materials used primarily in the packaging industry. Since the ink must dry by evaporation from the nonporous substrate, the vehicle for the ink must be a volatile solvent.

In flexographic printing the ink is commonly applied to the substrate by use of a rubber printing plate wrapped around a suitable cylinder. Accordingly, the volatile solvent used in flexographic inks must also be relatively inert toward the rubber compositions used to prepare the printing plates. Alcohols have been found to be quite suitable solvents for this use.

Acrylic polymers have been used heretofore as binders for flexographic inks. Typical acrylic polymers which have been used in this manner include those containing about 70 to 98.6 percent ethyl methacrylate, 0 to 30 percent methylacrylate and about 1.4 percent methacrylic acid. These polymers had inherent viscosities ranging from about 0.2 to 0.44. Although these acrylic polymers are the most alcohol-soluble, commercially available acrylic resins, difficulties have been encountered with regard to their alcohol solubility when used as binders for flexographic inks. It is generally necessary that a less polar cosolvent be used to assist in keeping the acrylic binder in solution. Only small amounts of these cosolvents can be used, however, since larger amounts would dissolve the rubber printing plate. Due to evaporation losses from the ink, it is necessary that alcohol be added from time to time to maintain the desired printing quality with the result that the cosolvent generally becomes more and more dilute. During this operation it is not unusual for the ink binder to eventually precipitate from the ink thereby forming a residue with the pigment. Accordingly, it would be desirable to provide a more alcohol-soluble acrylic polymer which is a good binder for flexographic inks.

SUMMARY OF THE INVENTION

Acrylic interpolymers have now been discovered which are improved binders for flexographic inks. These interpolymers consist essentially of, by weight, about 25 to 95 percent ethyl methacrylate, about 5 to 75 percent by weight of an acrylic monomer selected from the group consisting of n-butyl methacrylate, n-butyl acrylate, 2-ethylhexyl methacrylate and 2-ethylhexyl acrylate, and about 0.5 to 10 percent by weight of ethylenically unsaturated acid selected from the group consisting of acrylic acid, methacrylic acid and itaconic acid, said acrylic interpolymer having an inherent viscosity of about 0.2 to 0.35.

DETAILED DESCRIPTION OF THE INVENTION

The acrylic interpolymers of this invention provide an improvement over the acrylic polymers used heretofore as binders for flexographic inks. These interpolymers provide improved alcohol solubility and printability while also providing good crinkle adhesion, thermal lamination bond strength and adhesive bond strength for this use. The acrylic interpolymers of this invention consist essentially of three components; namely (1) ethyl methacrylate, (2) an acrylic monomer selected from the group consisting of n-butyl methacrylate, n-butyl acrylate, 2-ethylhexyl methacrylate and 2-ethylhexyl acrylate, and (3) an ethylenically unsaturated acid selected from the group consisting of acrylic acid, methacrylic acid and itaconic acid.

The term "acrylic" as used throughout the specification and claims is intended to cover alkyl methacrylates as well as alkyl acrylates and polymers thereof. The term "interpolymer consisting essentially of" is intended to include unspecified ingredients of impurities which do not materially affect the basic and novel characteristics of this invention. In other words, this term excludes unspecified ingredients or impurities in amounts which prevent the advantages of this invention from being realized.

The acrylic interpolymer should contain about 25 to 95 percent by weight of ethyl methacrylate. When less than about 25 percent of ethyl methacrylate is present, the thermal and adhesive bond strengths tend to be poor. When more than 95 percent of ethyl methacrylate is present, the crinkle adhesion tends to be poor. Preferably, about 45 to 75 percent of ethyl methacrylate is present.

The second essential component of the acrylic interpolymer is about 5 to 75 percent by weight of acrylic monomer selected from the group consisting of n-butyl methacrylate, n-butyl acrylate, 2-ethylhexyl methacrylate and 2-ethylhexyl acrylate. Of course, mixtures of these monomers may be used. When less than about 5 percent of this monomer is present, the crinkle adhesion tends to be poor. When more than about 75 percent of this monomer is present, the thermal and adhesive bond strengths tend to be poor. Preferably, the interpolymer contains about 25 to 55 percent of this monomer. The preferred monomer is n-butyl methacrylate.

The third essential component of the acrylic interpolymer is about 0.5 to 10 percent by weight of ethylenically unsaturated acid selected from the group consisting of acrylic acid, methacrylic acid and itaconic acid. Of course, a mixture of these acids can be used. At least about 0.5 percent of the acid component is necessary to provide good adhesion. The interpolymer should not contain more than about 10 percent of the acid component since greater amounts have an adverse effect upon the water resistance of the binder. Preferably, the interpolymer contains about 1 to 5 percent of the acid component. The preferred acid is acrylic acid.

The acrylic interpolymer should have an inherent viscosity of about 0.2 to 0.35. An inherent viscosity of at least about 0.2 is necessary in order to impart good durability to the resulting flexographic ink. Viscosities greater than about 0.35 render the flexographic ink difficult to handle or require a reduction in the solids content of the ink whereby resulting in a deficiency of binder. Preferably, the inherent viscosity is about 0.22 to 0.30. The inherent viscosities referred to herein are measured at 25° C. using 25 milligrams of the interpolymer in 50 cubic centimeters of chloroform.

The method of preparing the acrylic interpolymer of this invention is not critical. It is most convenient to prepare this interpolymer by the familiar solution polymerization technique using a suitable solvent, for example, an alcohol in which the interpolymer is dissolved for use as a flexographic ink binder. The interpolymer may also be prepared by other polymerization techniques such as bulk, suspension, or emulsion polymerization of the monomers. These processes are all well known in the art. Suitable polymerization methods are described, for example, by Riddle in "Monomeric Acrylic Esters" Rheinhold Publishing Corporation, N. Y. (1954), Chapter IV, and by Schildknecht in "Vinyl and Related Polymers," John Wiley & Sons, Inc., N. Y. (1952), Chapter IV. When methacrylic acid is used as the acid component of the copolymer, it should be added portion-wise rather than all at once since this acid tends to polymerize in a somewhat blocky fashion. Portion-wise addition of itaconic acid is also helpful since this acid also has some tendency to provide blocky interpolymers. Acrylic acid can be added all at once since it tends to provide more homogeneous polymers.

In the preparation of flexographic inks the acrylic interpolymers of this invention may be used as the sole binder, or they may be used in combination with other binder components. Suitable binder components which may be used in combination with the acrylic interpolymers of this invention include cellulosics such as nitrocellulose, shellacs, polyamides, alkyds, chlorinated and other rubbers, rosin derivatives, butyrates such as cellulose acetate butyrate, vinyls, and the like. When an auxiliary binder is used in combinations with the acrylic interpolymers of this invention, most often it is nitrocellulose or cellulose acetate butyrate. The addition of nitrocellulose or cellulose acetate butyrate to the binder system inparts hardness, scuff and abrasion resistance, blocking resistance, and heat-smear resistance. The amount of these additives can be controlled to provide optimum properties. As the amount of additive is increased, adhesion and flexibility of the ink are diminished, while the hardness and heat-smear resistance of the ink is improved.

The acrylic interpolymers of this invention are soluble in suitable alcohol solvents such as ethanol, n-propyl alcohol, isopropyl alcohol, secondary butyl alcohol, n-dodecyl alcohol, and the like. Experience has shown that cosolvents are not necessary when the interpolymers of this invention are used as the sole binder for the ink. However, depending upon other additives which may be present in the flexographic ink, the presence of small amounts of cosolvent may be desirable. Suitable cosolvents for this purpose include ethyl acetate, n-propyl acetate, isopropyl acetate, 2-nitropropane, and the like. When nitrocellulose or cellulose acetate butyrate is used as an auxiliary binder, the solvent typically contains about 50 to 80 percent by weight ethyl alcohol and 20 to 50 percent n-propylacetate.

In addition to the binder and solvent, flexographic inks also contain suitable pigment such as Milori Blue, Benzidine Yellow, and the like. The flexographic ink may also contain other additives such as surface active agents and emulsifiers which improve properties such as pigment wetting and leveling. Flexographic inks are prepared by mixing the components together using a suitable piece of equipment such as a ball mill, colloid mill, kinetic dispersion mill, or the like.

The acrylic interpolymers of this invention provide flexographic inks which have good alcohol tolerance, crinkle adhesion, adhesive bond strength and printability. These resins also provide good gloss and odor characteristics.

Flexographic inks are used primarily for printing on films and foils of non-porous substrates such as cellophane, polyvinyl chloride, polyvinylidene chloride, polyolefin, polystyrene, aluminum, and the like. These films and foils may be uncoated, or they may be coated for subsequent use on heat sealing equipment, or for use in the preparation of laminated films. Flexographic ink prepared from the acrylic interpolymers of this invention provide good heat seal properties. For example, laminates can be prepared from films in which the only heat-seal layer between the films is a printed coating of flexographic ink containing the resin of this invention.

EXAMPLE OF THE INVENTION

The following example illustrating the novel acrylic interpolymers of this invention and their use in flexographic inks is given without any intention that the invention be limited thereto. All parts and percentages are by weight unless otherwise specified.

A four-liter resin kettle equipped with an agitator, addition funnel, reflux condenser, thermometer and nitrogen purge was charged with 600 g. of ethyl methacrylate, 400 g. of n-butyl methacrylate, 15 g. of acrylic acid, 2.0 g. of n-dodecyl mercaptan chain-transfer agent and 1,120 g. of n-propyl acetate solvent. The mixture was agitated and heated to 93° C. and then a solution of 6.0 g. of azobisisobutyronitrile free-radical initiator in 400 g. of n-propyl acetate was added at the rate of 5.0 ml. per min. for 75 minutes. The temperature was maintained at 92°–94° C. After 75 minutes, initiator flow was stopped and the reaction mixture was held at 92°–94° C. for 15 minutes. Then the balance of the initiator solution was added all at once and reaction temperature was maintained at 96°–98° C. for 60 minutes. At the end of this final period the solution polymer was cooled and discharged.

Brookfield viscosity of the 40 percent solids solution resin in n-propyl acetate was 150 cps. The inherent viscosity of the resin isolated by thorough solvent evaporation was 0.25, measured as 0.25 g. polymer in 50 ml. chloroform at 25° C. using a No. 50 Cannon-Fenske Viscometer. The isolated resin was soluble in both 95 percent and absolute ethyl alcohol, and 40 percent solids solutions were clear and colorless.

The following test was carried out to determine resin solubility performance in a typical flexographic ink formulation (minus pigments) under printing press conditions: A solution containing 50 g. of the above 40 percent acrylic solution resin and 14.3 g. of nitrocellulose (containing 10.9-11.2 percent nitrogen and having a viscosity of one-fourth second measured by ASTM Test Method D-301-50 using a 12.2 percent solution of dry nitrocellulose resin dissolved in a solvent mixture containing 25 percent denatured (No. 1) 95 percent ethyl alcohol, 20 percent ethyl acetate, and 55 percent toluene) in 76 g. n-propyl acetate and 24 g. of denatured (2B) 95 percent ethyl alcohol was rapidly agitated in an open 8-ounce wide mouth jar. The original solution level was marked and evaporative solvent losses were replaced hourly by denatured (2B) 95 percent ethyl alcohol. The solution did not begin to become hazy or to increase in viscosity until after 22 hours.

The 40 percent acrylic solution resin of this example was diluted to 20 percent with n-propyl acetate and was drawn down on a polyvinylidene chloride coated 3/4 mil cellophane film with a 6 mil bar, air dried and baked at 100° C. for 5 minutes. Adhesion was tested by applying cellophane tape to the acrylic resin coated cellophane film with normal finger pressure and removing the tape by pulling gently at a 90° angle to the surface. Excellent adhesion was exhibited. Crinkle adhesion of the coating to the film was measured by momentarily crumpling a 6 × 6 in. sheet of the acrylic resin coated cellophane film in the hand with medium pressure. The tendency of the polymer film to crack and/or flake off was checked. Excellent crinkle adhesion was demonstrated.

Although the invention has been described and exemplified by way of specific embodiments, it is not intended that is be limited thereto. As will be apparent to those skilled in the art, numerous modifications and variations of these embodiments can be made without departing from the spirit of the invention or the scope of the following claims.

I claim:

1. An acrylic interpolymer consisting essentially of, by weight, 25 to 95 percent ethyl methacrylate, 5 to 75 percent acrylic monomer selected from the group consisting of n-butyl methacrylate, n-butyl acrylate, 2-ethylhexyl methacrylate, and 2-ethylhexyl acrylate, and 0.5 to 10 percent of ethylenically unsaturated acid selected from the group consisting of acrylic acid, methacrylic acid, and itaconic acid, said acrylic interpolymer having an inherent viscosity of 0.2 to 0.35, measured at 25° C. using 25 milligrams of the interpolymer in 50 cubic centimeters of chloroform.

2. The composition of claim 1 in which the acrylic monomer is n-butyl methacrylate.

3. Th composition of claim 2 in which the ethylenically unsaturated acid is acrylic acid.

4. The composition of claim 3 in which the inherent viscosity is 0.22 to 0.3.

5. The composition of claim 1 which consists essentially of 45 to 75 percent ethyl methacrylate, 25 to 55 percent acrylic monomer and 1 to 5 percent ethylenically unsaturated acid.

6. The composition of claim 5 in which the acrylic monomer is n-butyl methacrylate.

7. The composition of claim 6 in which the ethylenically unsaturated acid is acrylic acid.

8. The composition of claim 7 in which the inherent viscosity is 0.22 to 0.3.

* * * * *

UNITED STATES PATENT OFFICE
CERTIFICATE OF CORRECTION

Patent No. 3,764,587    Dated October 9, 1973

Inventor(s) David William Zunker

It is certified that error appears in the above-identified patent and that said Letters Patent are hereby corrected as shown below:

Column 2, line 14, "of" should be -- or --.  Column 5, line 16, "is" should be -- it --.  Column 6, line 10, Claim 3, "Th" should be -- The --.
Column 2, line 62, "25 milligrams" should be -- 250 milligrams --.  Column 6, in claim 1, "25 milligrams" should read -- 250 milligrams --.

Signed and sealed this 14th day of May 1974.

(SEAL)
Attest:

EDWARD M.FLETCHER,JR.
Attesting Officer

C. MARSHALL DANN
Commissioner of Patents